United States Patent
Zaatarah (10) Patent No.: US 10,547,900 B2
(45) Date of Patent: Jan. 28, 2020

(54) METHOD AND SYSTEM FOR PROVISION OF A PLURALITY OF MULTIPLE MEDIA COMPONENTS

(71) Applicant: 360MEA Ltd, Road Town, Tortola (VG)

(72) Inventor: Khaled Zaatarah, Dubai (AE)

(73) Assignee: 360MEA LTD, Road Town (VG)

( * ) Notice: Subject to any disclaimer, the term of this patent is extended or adjusted under 35 U.S.C. 154(b) by 0 days.

(21) Appl. No.: 16/233,107

(22) Filed: Dec. 27, 2018

(65) Prior Publication Data
US 2019/0306566 A1    Oct. 3, 2019

Related U.S. Application Data

(60) Provisional application No. 62/648,843, filed on Mar. 27, 2018.

(51) Int. Cl.
| | |
|---|---|
| H04N 7/10 | (2006.01) |
| H04N 21/44 | (2011.01) |
| H04N 21/2187 | (2011.01) |
| H04N 21/8545 | (2011.01) |
| G06F 1/16 | (2006.01) |
| H04N 21/266 | (2011.01) |

(52) U.S. Cl.
CPC ..... *H04N 21/44008* (2013.01); *G06F 1/1694* (2013.01); *H04N 21/2187* (2013.01); *H04N 21/26603* (2013.01); *H04N 21/8545* (2013.01)

(58) Field of Classification Search
CPC .......... H04N 21/2187; H04N 21/4316; H04N 21/4622; H04N 21/812
See application file for complete search history.

(56) References Cited

U.S. PATENT DOCUMENTS

| | | | |
|---|---|---|---|
| 2011/0157231 A1* | 6/2011 | Ye ........................... | G09G 3/20 345/649 |
| 2014/0089067 A1* | 3/2014 | Filev .................. | G06Q 30/0207 705/14.19 |
| 2014/0274307 A1* | 9/2014 | Gonzalez ............. | A63F 13/655 463/25 |
| 2018/0146217 A1* | 5/2018 | Kedenburg, III .. | H04N 21/2187 |

\* cited by examiner

*Primary Examiner* — Gigi L Dubasky
(74) *Attorney, Agent, or Firm* — Growth IP; Brian Lao (57) ABSTRACT

Embodiments of a method and/or system (e.g., for providing a plurality of media components at a user device, etc.) can include: collecting one or more user inputs associated with media component playback at the user device; based on a first media component provided at a first media interface presented at the user device, determining a second media component for playback at the user device; and/or providing the second media component, in coordination with provision of the first media component at a second media interface presented at the user device of the user.

19 Claims, 10 Drawing Sheets

FIGURE 10C

METHOD AND SYSTEM FOR PROVISION OF A PLURALITY OF MULTIPLE MEDIA COMPONENTS

CROSS-REFERENCE TO RELATED APPLICATIONS

This application claims the benefit of U.S. Provisional Application Ser. No. 62/648,843, filed on 27 Mar. 2018, which is incorporated herein in its entirety by this reference.

TECHNICAL FIELD

This technology relates generally to the field of media content provision, and more specifically to a new and useful method and system for provision of a plurality of media components.

DESCRIPTION OF THE EMBODIMENTS

The following description of the embodiments is not intended to limit the embodiments, but rather to enable any person skilled in the art to make and use.

1. Overview

Figure 1:
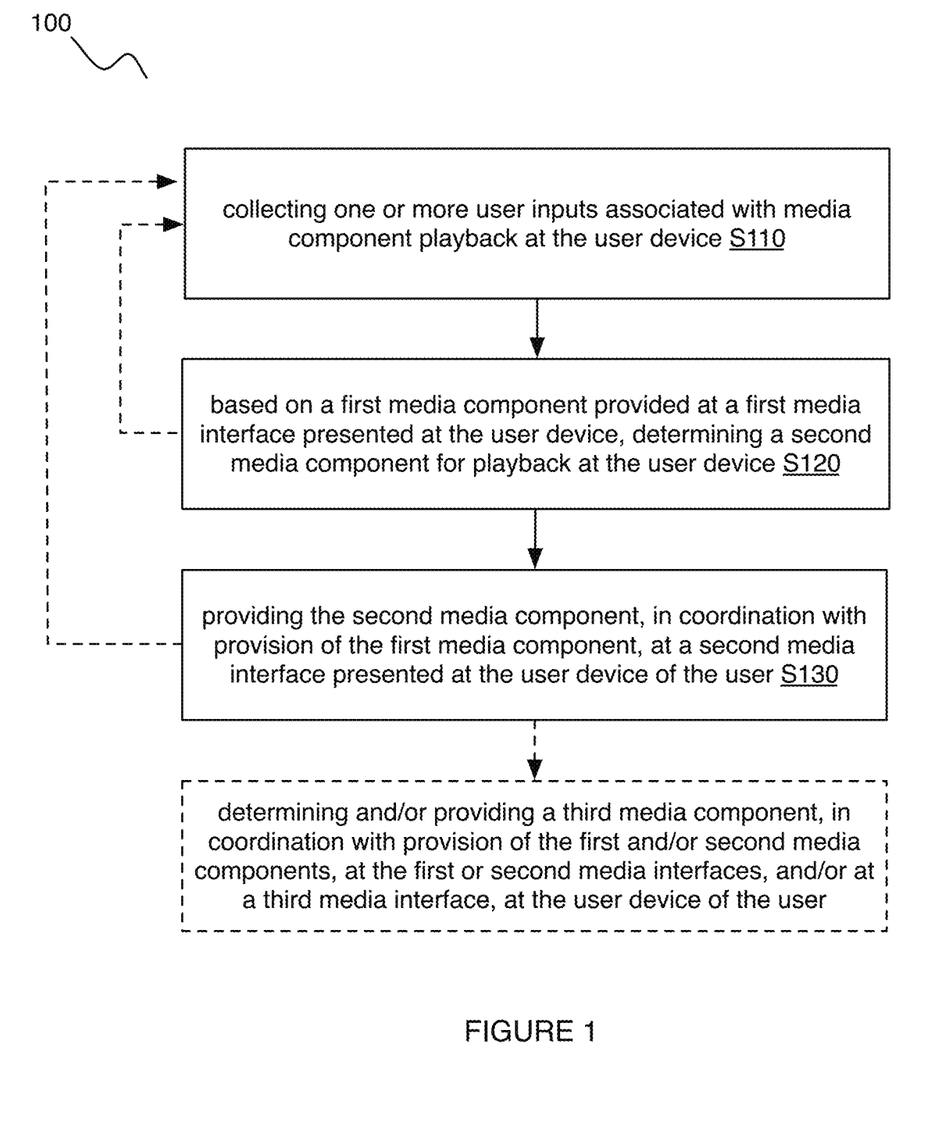
FIG. 1 includes a flowchart representation of variations of an embodiment of a method for providing a plurality of media components.
Figure 2:
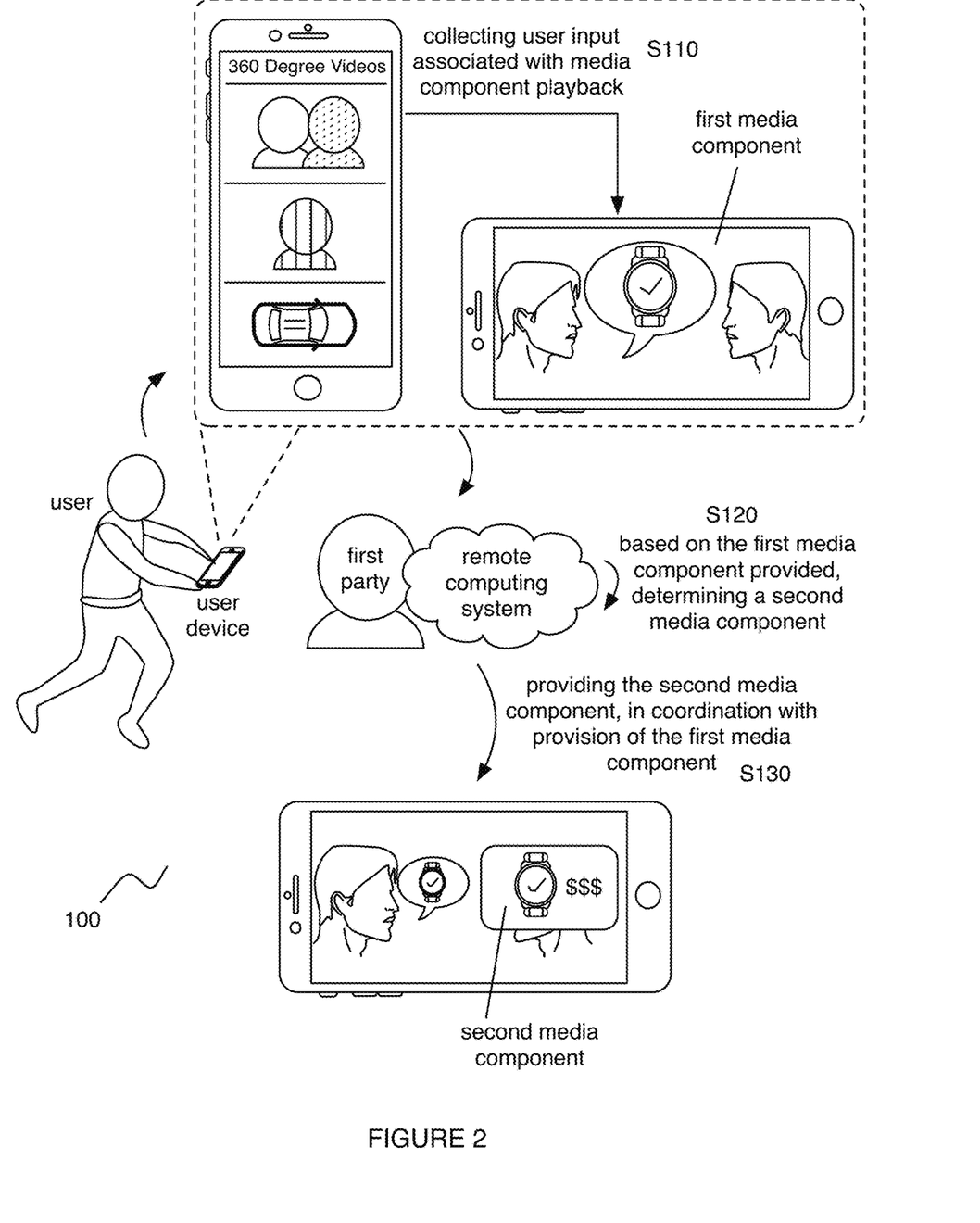
FIG. 2 includes a flowchart representation of variations of an embodiment of a method for providing a plurality of media components.

As shown in FIGS. 1-2, embodiments of a method 100 (e.g., for providing a plurality of media components at a user device, etc.) can include: collecting one or more user inputs associated with media component playback at the user device Silo; based on a first media component (e.g., a primary media component, etc.) provided at a first media interface presented at the user device, determining a second media component (e.g., a supplementary media component, etc.) for playback at the user device S120; and/or providing the second media component, in coordination with provision of the first media component (e.g., simultaneously with first media component provision, etc.), at a second media interface (e.g., overlaid on the first media interface) presented at the user device of the user (e.g., presented simultaneously with the first media interface, etc.) S130.

Additionally or alternatively, embodiments of the method 100 can include: determining and/or providing any suitable number and type of media components at any suitable number and type of media interfaces; and/or any other suitable processes (e.g., to provide a plurality of types of media to a user for simultaneous and/or other types of viewing for improving graphical display of internet-related media, etc.).

Embodiments of the method 100 and/or system 200 can function to facilitate improved presentation of media (e.g., audio, visual, touch, etc.) at one or more user devices. In a specific example, the method 100 can include collecting a user selection of a first media component (e.g., a first content video) at a mobile application executing on a mobile device; initiating playback of the first media component at a first media interface (e.g., a first digital content screen with dimensions sized to fit the dimensions of a physical screen of the mobile device, etc.) presented through the mobile application; determining a second media component for playback at the user device, based on the first media component (e.g., identifying a second content video, such as a user-generated content video generated during the presentation of the first content video and associated with the first content video, etc.); and providing the second media component in coordination with providing the first media component (e.g., providing the first and second media components simultaneously), where the second media component can be provided at a second media interface positioned proximal the first media interface (e.g., provided at a second digital content screen with dimensions smaller than that of the first digital content screen, where the second digital content screen is positioned within the borders of the first digital content screen, etc.).

Additionally or alternatively, data described herein (e.g., media components, media interfaces, media component parameters, media interface parameters, etc.) can be associated with any suitable temporal indicators (e.g., seconds, minutes, hours, days, weeks, etc.) including one or more: temporal indicators indicating when the data was collected, determined, transmitted, received, and/or otherwise processed; temporal indicators providing context to content described by the data, such as temporal indicators indicating time periods for playback of supplementary media components (e.g., for facilitating coordination with presentation of relevant primary media component content for improved user experience of the presented content, etc.); changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores (e.g., for ranking user-generated content generated during presentation of a primary media component, where the user-generated content can be eligible for presentation at a second media interface during the primary media component provision, where selection of a second media component to present in coordination with the primary media component can be based on the ranking; relevance scores, such as describing relevance of a media component to one or more users; similarity scores, such as describing similarity between media components, for determination of primary and supplementary media components to present in combination, etc.), binary values, classifications (e.g., type of media component, topic categories, etc.), confidence levels, values along a spectrum, and/or any other suitable types of values. Any suitable types of data described herein can be used as inputs (e.g., for different models described herein; for portions of the method 100; etc.), generated as outputs (e.g., of models), and/or manipulated in any suitable manner for any suitable components associated with the method 100 and/or system 200.

One or more instances and/or portions of the method 100 and/or processes described herein can be performed asynchronously (e.g., sequentially), concurrently (e.g., in parallel; concurrently on different threads for parallel computing to improve system processing ability for processing user-generated content; for determination and/or provision of primary and/or supplementary media components; etc.), in temporal relation to a trigger event (e.g., performance of a portion of the method 100), and/or in any other suitable order at any suitable time and frequency by and/or using one or more instances of the system 200, components, and/or entities described herein.

Embodiments of the system 200 can include a remote computing system (e.g., for processing and/or storage of user-generated content, user data, media components, parameters, other suitable data described herein; for facilitating provision of media components; etc.); an application executable on a user device (e.g., a mobile app providing a user interface for accessing media components; for presentation of media interfaces; etc.); media interfaces, media components, optical recording systems (e.g., for generation of media components, etc.); and/or any other suitable components.

The system 200 and/or portions of the system 200 can entirely or partially be executed by, hosted on, communicate with, and/or otherwise include: a remote computing system (e.g., a server, at least one networked computing system, stateless, stateful; etc.), a local computing system, a user device (e.g., mobile phone device, other mobile device, personal computing device, tablet, wearable, head-mounted wearable computing device, virtual reality device, augmented reality device, wrist-mounted wearable computing device, etc.), databases (e.g., media component databases, user databases, etc.), application programming interfaces (APIs) (e.g., for accessing data described herein, etc.) and/or any suitable component. Communication by and/or between any components of the system can include wireless communication (e.g., WiFi, Bluetooth, radiofrequency, Zigbee, Z-wave, etc.), wired communication, and/or any other suitable types of communication.

The components of the system 100 can be physically and/or logically integrated in any manner (e.g., with any suitable distributions of functionality across the components, such as in relation to portions of the method 100; etc.). In variations, components of the system 200 can be positioned at (e.g., mounted at, integrated with, located proximal, overlaid, positioned within, positioned overlapping, etc.) any suitable location (e.g., in relation to other components of the system 200, etc.). Additionally or alternatively, components of the system 200 can be integrated with any suitable existing components (e.g., existing mobile devices, etc.). However, the method 100 and/or system 200 can be configured in any suitable manner.

2.1 Collecting User Inputs.

The method 100 can include collecting one or more user inputs Silo associated with media component playback at the user device, which can function to collect user interactions (e.g., with a mobile application for presentation of the media interfaces and/or components, etc.) relating to determination and/or provision of the media components.

User inputs can include any one or more of: user-generated content (e.g., user-generated media components, such as media components uploaded by users for provision through a mobile application, etc.), touch inputs (e.g., at a touch screen of a user device), audio inputs (e.g., verbal inputs collected at an audio sensor of a user device), optical inputs (e.g., collected at a camera of a user device, etc.), other inputs collectable by sensors, verbal inputs (e.g., typed in at a physical or digital keyboard of a user device, etc.), and/or any other suitable user inputs.

Figure 10A:
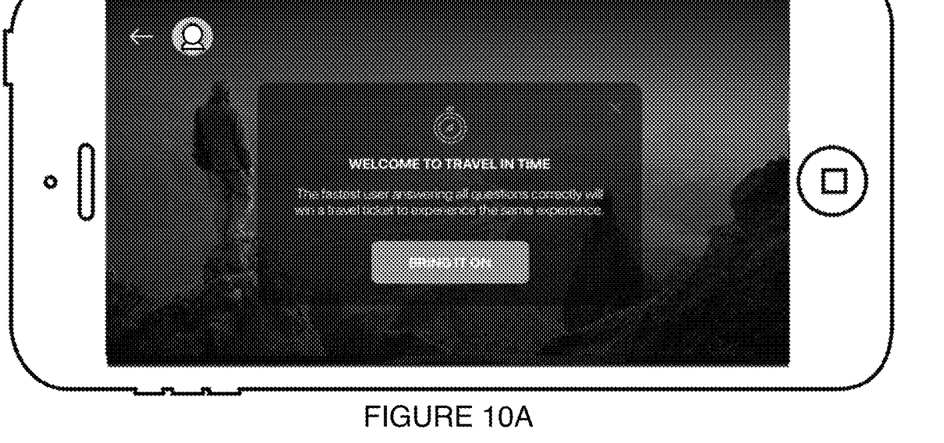
FIGS. 10A-10C include example representations of presenting quizzes associated with a variation of an embodiment of a method for providing a plurality of media components.
Figure 10B:
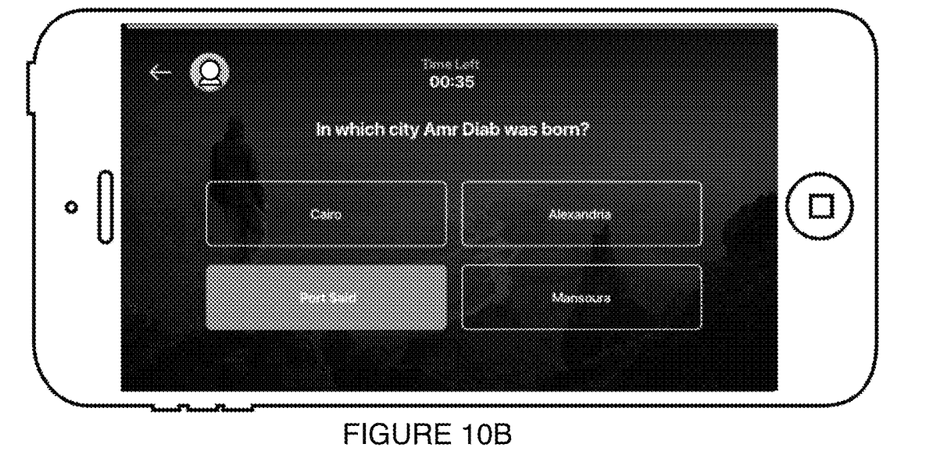
Figure 10C:
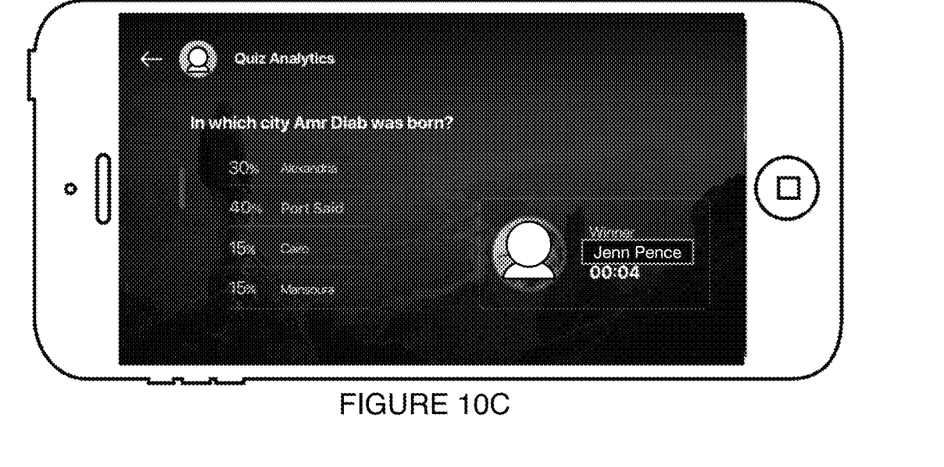

In a variation, as shown in FIGS. 10A-10C, collecting user inputs can include collecting one or more responses to a survey (e.g., a quiz, a survey including questions about the user and/or media components, etc.), such as where the survey can be a media component provided through a media interface presented at a user device. In an example, a survey response can be collected for a survey presented as a second media component overlaid (e.g., with a degree of transparency to enable the user to continuously view the first media component, etc.) a first media component. In another example, a plurality of user inputs can be collected for a plurality of users simultaneously presented with the same or different surveys (e.g., quizzes), where users can be ranked (e.g., based on number of correct answers, answer speed, etc.) based on their user inputs (e.g., where redeemable digital tokens, monetary items, products, and/or other suitable benefits can be transmitted to the user, such as through their user account, etc.). In another example, survey responses, other user inputs, user behaviors, and/or any other suitable data (e.g., data report analytics, etc.) can be transmitted to a third party and/or other suitable entity. In a specific example, the second media component (and/or supplementary media component) includes a survey, where providing the second media component includes providing the survey in coordination with providing the first media component, and/or where the method can include collecting, during provision of the survey, a plurality of survey responses from a plurality of users, where the plurality of survey responses includes a survey response from the user; and/or providing the user with a redeemable digital token based on the survey response from the user.

In another variation, collecting user inputs can include facilitating a user redemption, such as of redeemable digital tokens (e.g., points, digital currencies, etc.), monetary items (e.g., through a payment transaction, etc.), and/or other suitable redeemable items. In an example, facilitating user redemption can be in response to user interaction with a supplementary media component (e.g., a supplementary product item presented in coordination with an associated primary media component, an advertisement, a contest, etc.), a primary media component, and/or any other suitable aspect associated with presented media interfaces. In an example, facilitating a user redemption can include facilitating a bidding process through primary and supplementary media components (e.g., where the primary media component can present the item and/or service being bid for and the supplementary media component can present that status of the bids, etc.).

Collecting user inputs can include collecting one or more user inputs sampled at one or more sensors (e.g., of the user device at which the media interfaces are presented, etc.). Collected sensor data can include any one or more of: motion sensor data (e.g., accelerators, gyroscope, magnetometer, etc.), optical sensor data (e.g., camera data, image sensor data, light sensor data, etc.), audio sensor data (e.g., microphone data, etc.), location sensor data (GPS receiver data; beacon data; indoor positioning system data; compass data; etc.), temperature sensor data, weight sensor data, humidity sensor data, biometric sensor data (e.g., heart rate sensor data, fingerprint sensor data, facial recognition data, bio-impedance sensor data, etc.), and/or or any other suitable sensor data. Sensor data can be used in determining and/or providing media components, and/or in performing any suitable portions of the method 100.

The one or more user inputs can be collected for any suitable media components (e.g., surveys, quizzes, advertisements, video, audio, graphics, etc.) provided at any suitable media interfaces (e.g., presented at a first media interface sized to fit the dimensions of a user device; presented at a second media interface overlaid and smaller than a first media interface; etc.). The one or more user inputs can be collected at the first and/or second media interface, and/or any other suitable media interface provided. However, collecting user inputs Silo can be performed in any suitable manner.

2.2 Determining a Supplementary Media Component.

The method 100 can include, based on a first media component (e.g., a primary media component, etc.) provided at a first media interface presented at the user device, determining a second media component (e.g., a supplementary media component, etc.) for playback at the user device S120, which can function to determine a supplementary media component and/or parameters thereof for presentation in coordination with a primary media component.

Media components (e.g., a primary media component, a supplementary media component, etc.) can include any one or more of: user-generated content (e.g., videos, images, audio, graphics, content of any suitable format parameters described herein, etc.); advertisements; redemption interfaces (e.g., for redemptions of redeemable digital tokens, of monetary items, etc.); components associated with temporal indicators (e.g., timelines describing the content portions of the media component at different time points and/or time periods; etc.); user controls (e.g., for controlling the view, perspective, and/or other suitable parameter of the media component, such as in real-time; for recording, such as screen capture or video capture, of the first and/or second media components; for saving the first and/or second media components, such as for later viewing; etc.); and/or any other suitable components suitable for presentation to one or more users.

As shown in FIGS. 4A-4B and 5A-5C, in a variation, media components can include redemption interfaces for facilitating purchase transactions, user redemptions of redeemable digital tokens, and/or redemptions of any suitable items, such as for product purchases (e.g., item purchases, service purchases, etc.), feature accessibility (e.g., access to features of a mobile application at which the media interfaces are presented, etc.), and/or for any other user benefits. In an example, the method 100 can include determining a redemption interface for a second media component to be presented at a second media interface simultaneously with a first media component presented at a first media interface, where the redemption interface can advertise and/or otherwise facilitate a transaction for an item related to the first media component (e.g., an item being discussed in the content of the first media component; a service related to the content of the first media component). As such, redemption interfaces can be determined and/or presented in coordination with primary media components, for supplementing the primary media components in real-time. In an example, transactions and/or other suitable data associated with redemption interfaces (e.g., user redemption behaviors and/or analytics, etc.) can be provided to a third party. However, determining and/or providing redemption interfaces can be performed in any suitable manner.

Figure 6A:
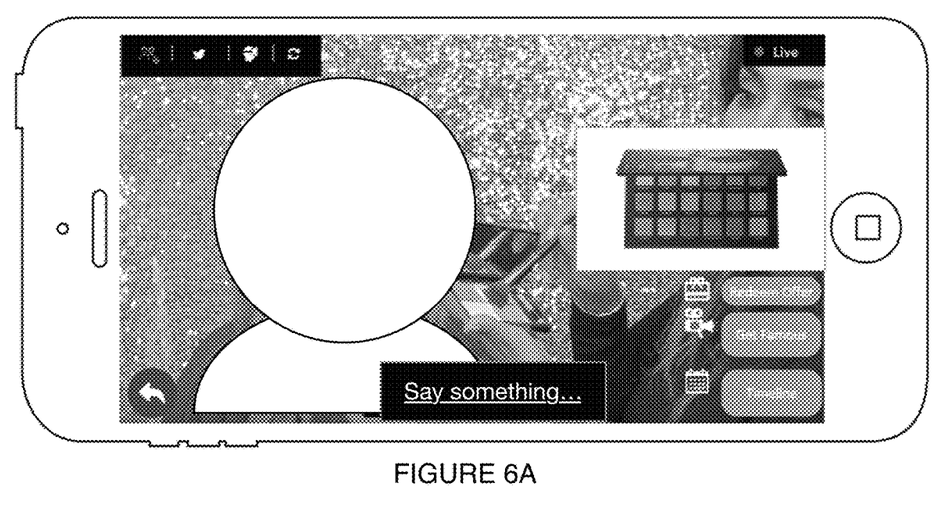
FIGS. 6A-6B include example representations of presenting advertisements associated with a variation of an embodiment of a method for providing a plurality of media components.
Figure 6B:
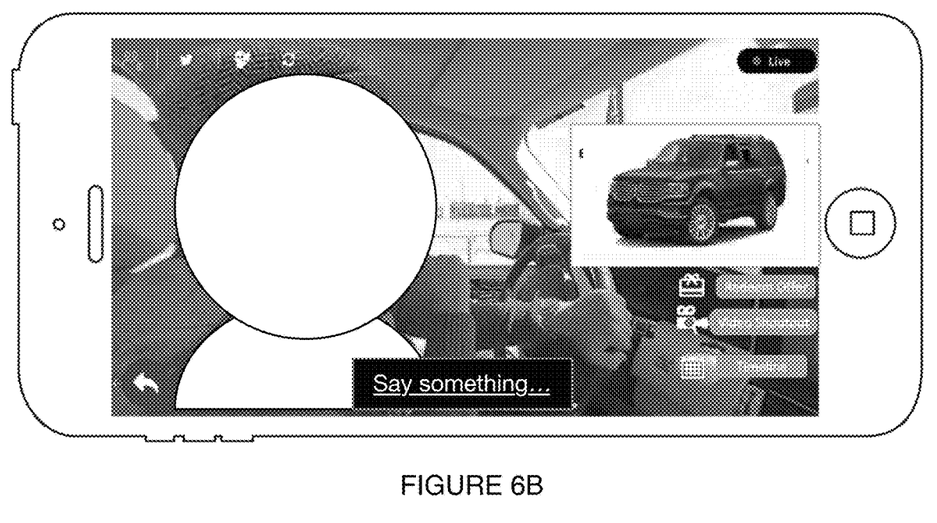

As shown in FIGS. 6A-6B, in a variation, media components can include advertisements (e.g., with any suitable format parameters described herein), such as advertisements determined based on an analysis of the content being presented as a primary media component (e.g., such as based on a real-time analysis of the content shown at a given timestamp for the primary media component, etc.). Any suitable number of advertisements (and/or other suitable media components) can be displayed simultaneously, serially, and/or in any suitable temporal relation (e.g., in temporal relation to presentation of different content components of the primary media component, etc.). In an example, the method 100 can include providing an advertisement at a second media interface, based on the current content of the primary media component presented at a first media interface; collecting a user input associated with the advertisement (e.g., a user finger tap of the advertisement at the second media interface; etc.); and in response to collecting the user input, providing a redemption interface at the second media interface, for facilitating a purchase transaction associated with the content displayed in the second media component. In another example, the method 100 can include, in response to collecting user inputs associated with an advertisement, selecting a plurality of media components (e.g., a pair of a related first and second media component, etc.) for playback at a plurality of media components. However, advertisements can be configured in any suitable manner.

In examples, advertisements and/or suitable media components associated with products, can include, advertise, describe, indicate, and/or otherwise be associated with one or more products provided by one or more creators (e.g., creators of the user-generated content) and/or any suitable users. In a specific example, for a first media component including user-generated content from a creator, providing a second media component can include providing an advertisement for a product provided by the creator, in coordination (e.g., concurrently with) providing (e.g., presenting) the first media component (e.g., playback of the user-generated content from the creator). Any suitable types of products and/or associated product data can be provided by one or more users. Product data can include any one or more of offers, prices, descriptions, images, bullet points, titles, item characteristics, disclaimers, weights, dimensions, discounts, media, related products, benefits, features, and/or any suitable product data. In a specific examples, user-provided products can be purchased (e.g., using digital tokens), such as via redemption interfaces provided to one or more users (e.g., viewers of a creator's user-generated content and provided product; etc.). However, user-provide products can be configured in any suitable manner.

Figure 3:
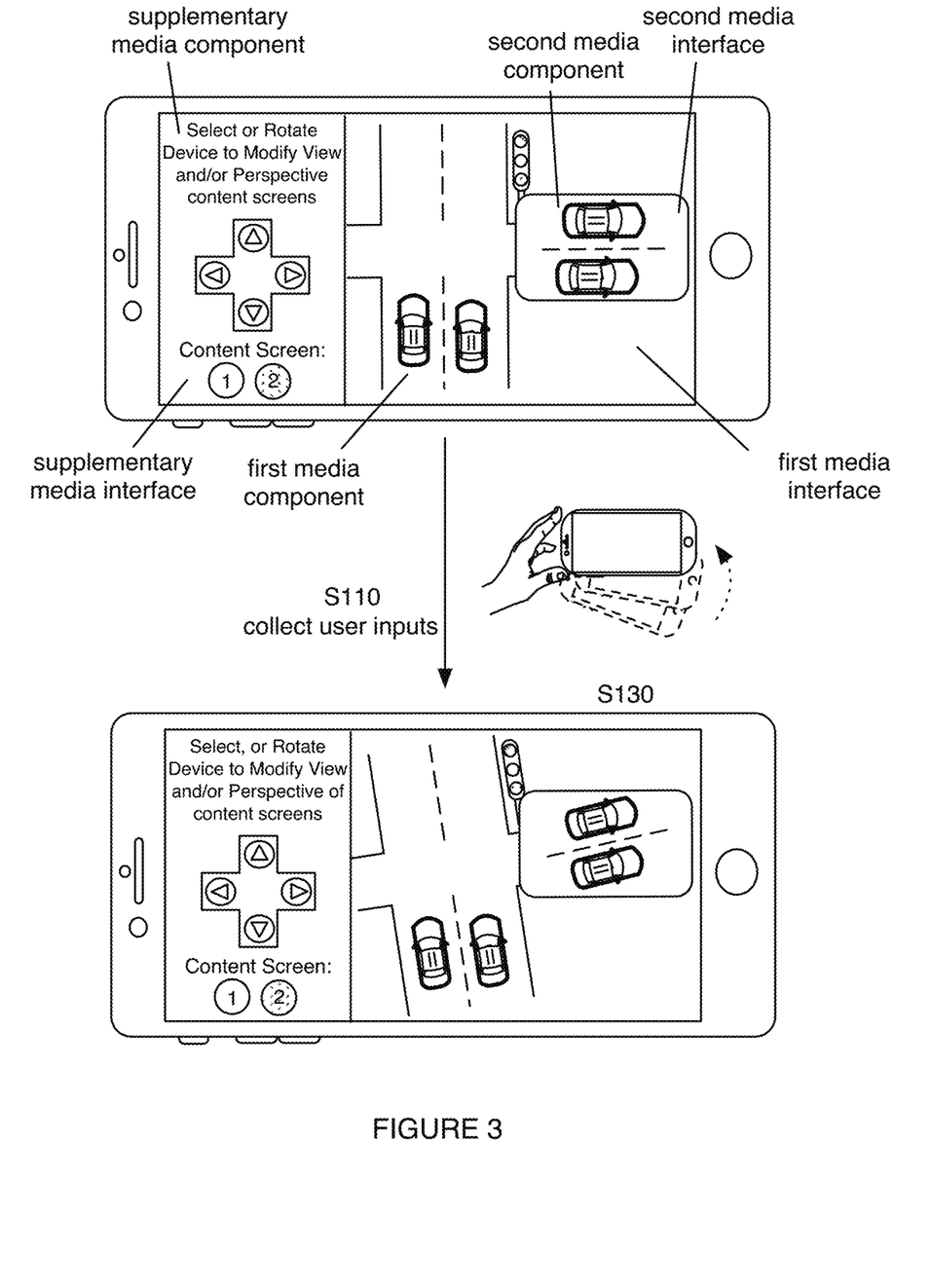
FIG. 3 includes an example representation of a variation of user control of a plurality of media components.
Figure 4A:
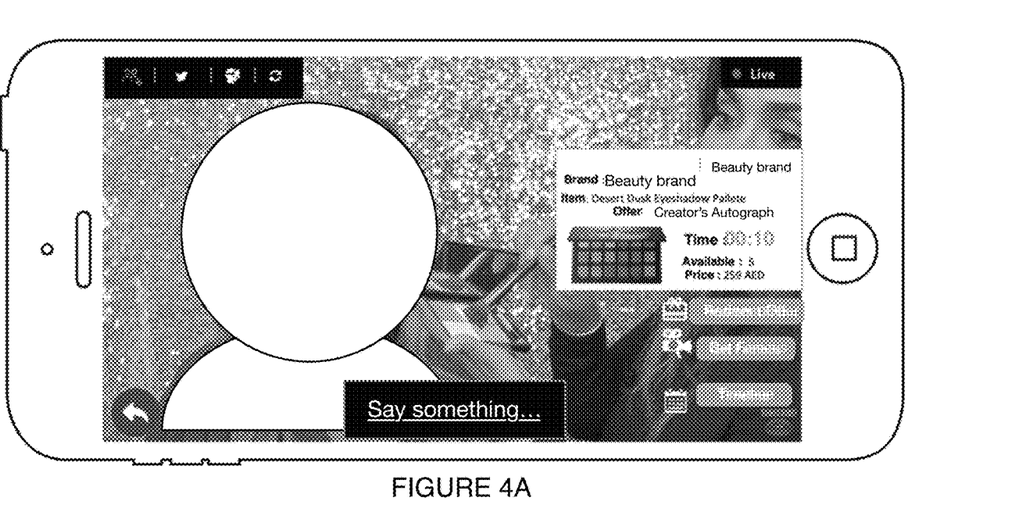
FIGS. 4A-4B include example representations of a variation of an embodiment of a method for providing a plurality of media components.
Figure 4B:
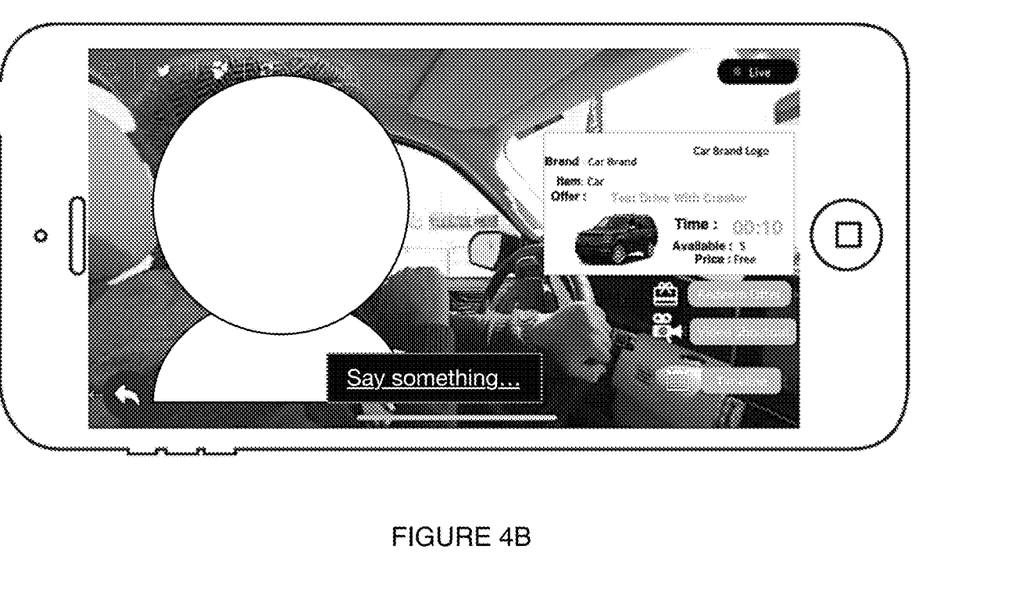
Figure 5A:
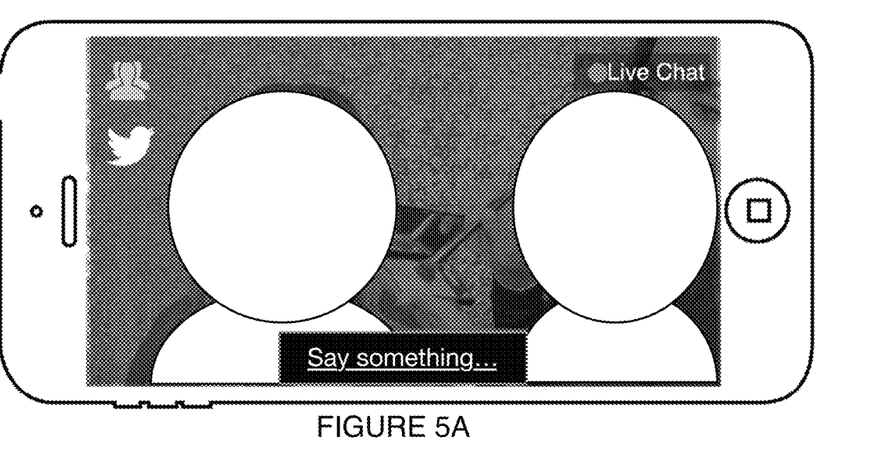
FIGS. 5A-5C include example representations of facilitating a user redemption and/or payment transaction.
Figure 5B:
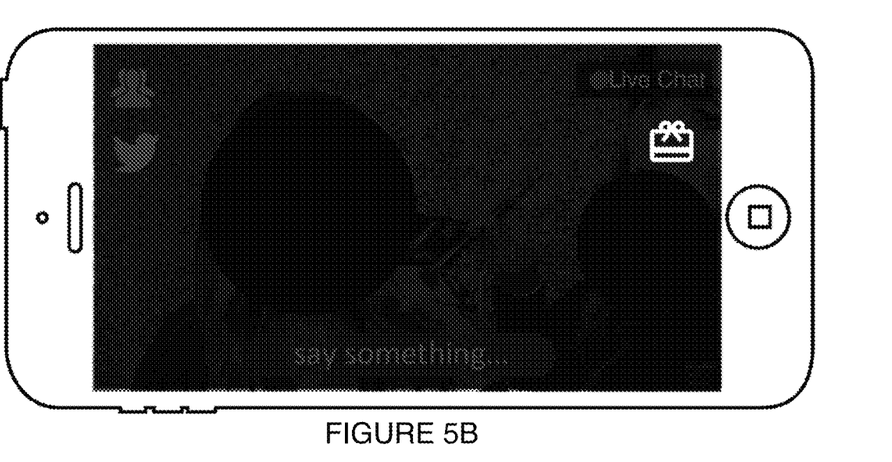
Figure 5C:
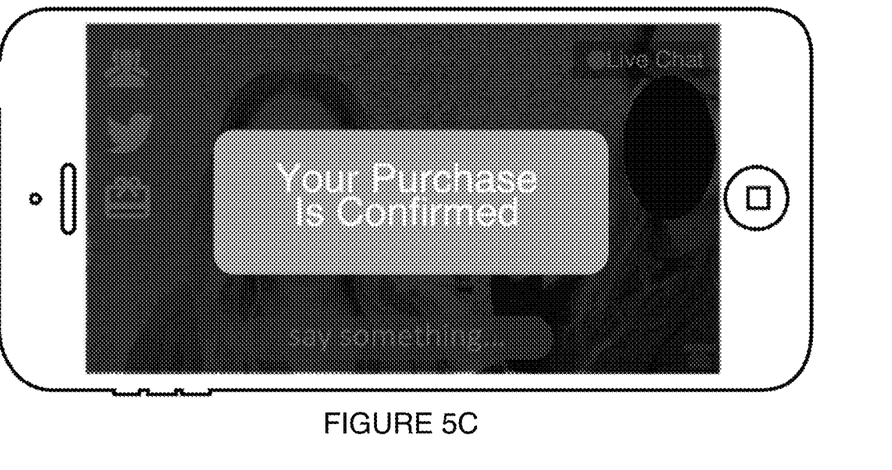
Figure 8:
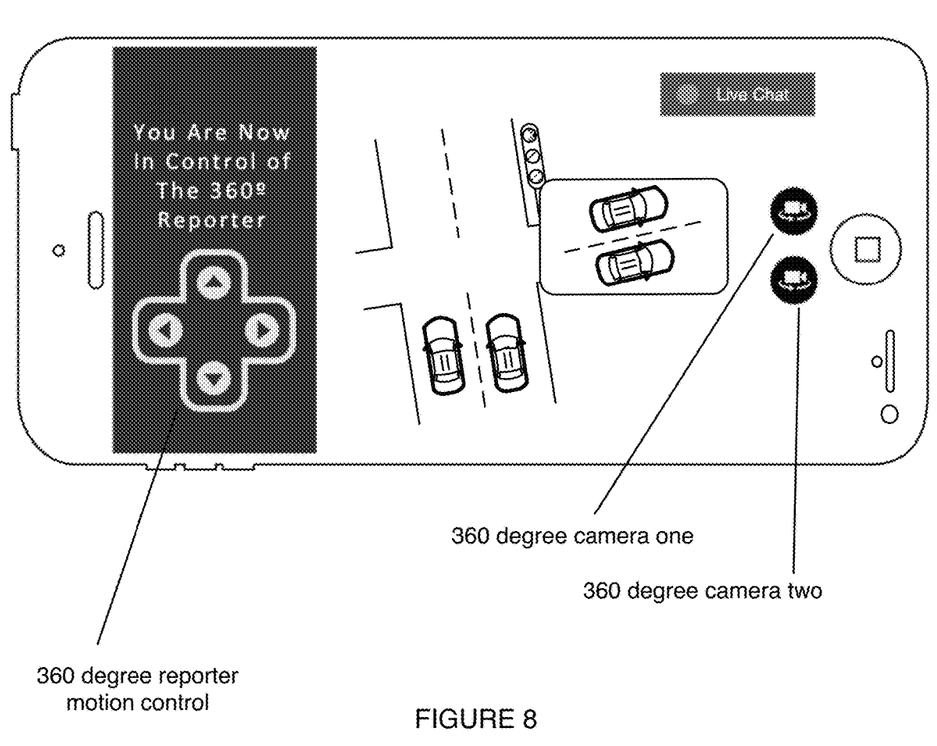
FIG. 8 includes an example representation of user controls associated with a variation of an embodiment of a method for providing a plurality of media components.

As shown in FIGS. 3 and 8, in a variation, media components can include user controls for controlling one or more perspectives and/or views of one or more media components (e.g., through up, down, left, and, right options selectable by a user for controlling the perspective and/or view, such as the rotation of the perspective and/or view, etc.). In an example, the method 100 can include providing a second media component including user controls for controlling the perspective and/or view of a first media component. In another example, user controls can be provided for controlling the perspective and/or view of a plurality of media components (e.g., simultaneously controlling multiple views and/or perspectives of the same core content, etc.). In another example user controls can be provided as a supplementary media component for facilitating collection of user inputs for selecting between a plurality of perspectives and/or views. Media components including user controls and/or other suitable media components can be provided at every user, a subset of users (e.g., users who complete a transaction through the redemption interface; etc.), for a continuous time period, for a limited time period (e.g., for 2 minutes, based on the magnitude of redemption provided by a user at a redemption interface; etc.), and/or can be provided in any suitable manner.

In a specific example, a second media component (and/or suitable supplementary media component) includes user controls for controlling a view of the first media component, and where the method can include, in response to collecting a user touch input at the user controls during a time period, adjusting the view of the first media component at the mobile device based on the user touch input; and/or in response to collecting, during the time period, motion sensor data corresponding to a motion sensor of the mobile device, adjusting the view of the first media component at the mobile device based on the motion sensor data. In a specific example, the view of the first media component includes a 360 degree view of the first media component, and where the method can include providing, in coordination with providing the first (e.g., user-generated content) and the second media components (e.g., user controls), a third media component (e.g., an additional view of the user-generated content; etc.) associated with the first media component; in response to collecting the user touch input at the user controls during the time period, adjusting a 360 degree view of the third media component, concurrently with adjusting the 360 degree view of the first media component, at the mobile device based on the user touch input; and/or in response to collecting, during the time period, motion sensor data corresponding to a motion sensor of the mobile device, adjusting the 360 degree view of the third media component, concurrently with adjusting the 360 degree view of the first media component, at the mobile device based on the motion sensor data. However, user controls can be configured in any suitable manner.

In a specific example, the method can include, in response to collecting motion sensor data corresponding to a motion sensor of the user device, concurrently adjusting a 360 degree view of the first media component and/or a 360 degree view of the second media component, based on the motion sensor data.

Figure 7A:
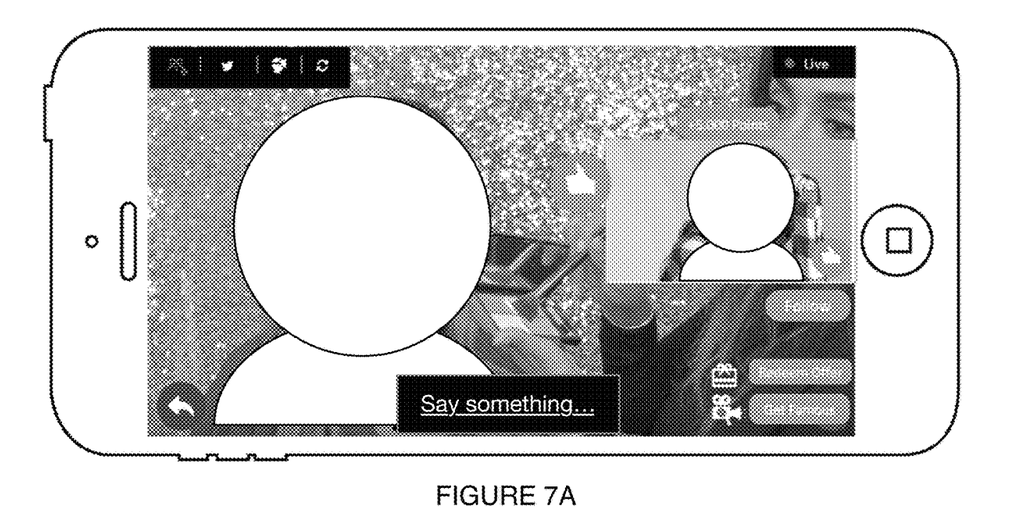
FIGS. 7A-7B include example representations of presenting user-generated content associated with a variation of an embodiment of a method for providing a plurality of media components.
Figure 7B:
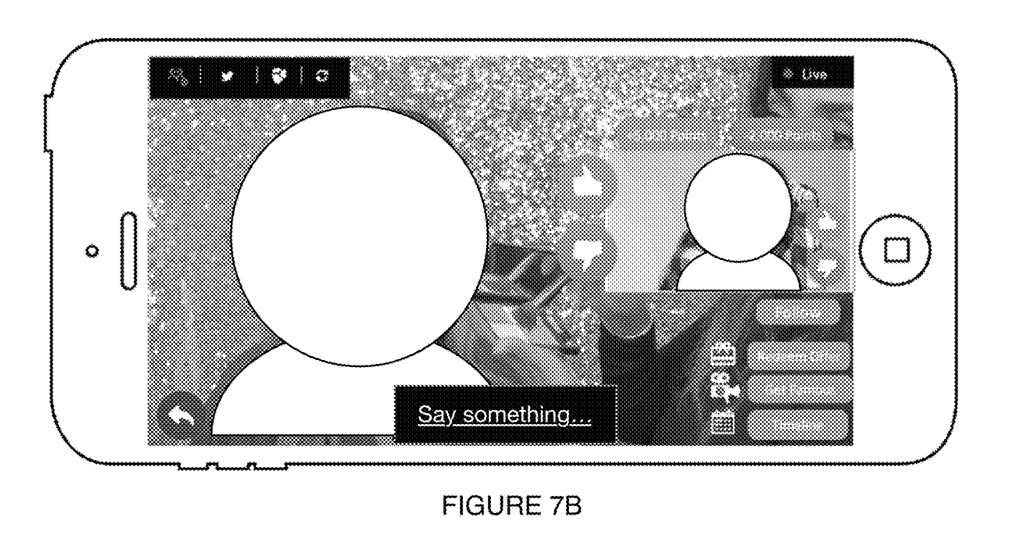

As shown in FIGS. 7A-7B, in a variation, media components can include user-generated content generated, uploaded, and/or otherwise processed in association with a primary media component (and/or other suitable media component). For example, supplementary media components can include user-generated videos captured by a user during a live presentation of a primary media component (e.g., a sporting event, a broadcast of another user, etc.). Any suitable amount of user-generated content can be collected in association with a media component (e.g., a previously uploaded media component; a media component being presented in a live manner; etc.), such as a set of user-generated videos from a plurality of users. In an example, the playback of the first media component includes live playback of the first media component, where the second media component includes user-generated content, and where the method can include collecting, during the live playback of the first media component, the user-generated content, where providing the second media component in coordination with providing the first media component includes providing the user-generated content during the live playback of the first media component. In a specific example, the method can include determining, during the live playback of the first media component, a third media component (e.g., advertisement, any suitable type of media component, etc.) based on the user-generated content (e.g., based on an analysis of the content of the user-generated content; of the second media component; etc.) provided during the live playback of the first media component; and providing the third media component, at the mobile device, in coordination with providing the user-generated content (e.g., after the provision of the user-generated content; concurrently with the provision of the user-generated content; provision of an advertisement advertising a product associated with the user-generated content, such as concurrently with provision of the user-generated content; etc.).

In a specific example, determining the third media component includes: determining a real-time analysis of the content of the user-generated content; and selecting, during the live playback of the first media component, the third media component based on the real-time analysis of the content of the user-generated content (e.g., determining the media component based on analysis of words spoken, of audiovisual content, etc.). In a specific example, the method can include providing a redemption interface, during the live playback of the first media component and in coordination with providing the third media component (e.g., after; concurrently, such as overlaid on the first media component and proximal the third media component; etc.), for facilitating a purchase transaction of a product associated with the third media component and provided by a creator associated with the first media component (and/or the second media component); and collecting, via the redemption interface, a digital token from the user during the live playback of the first media component.

Creators of user-generated content can be voted upon, provided with digital tokens, commented upon, and/or otherwise interacted with, such as via a supplementary media component and/or any suitable media component and/or interface.

In an example, the method 100 can include collecting a set of user-generated videos during presentation of a primary media component; selecting a subset of the set of user-generated videos (e.g., based on relevance; user data such as user behavior and/or user connections to other users; media component quality such as in relation to audiovisual quality; camera positioning; content; redemptions; where selection can be through manual selection, automatic selection through artificial intelligence approaches described herein; etc.); and presenting the subset of the set of user-generated videos in coordination with presentation of the primary media component (e.g., simultaneously, serially, etc.). In a specific example, collecting the user-generated content includes collecting, during the live playback of the first media component, a set of user-generated videos from a plurality of users, and where the method further includes selecting a user-generated video from the set of user-generated videos, where providing the user-generated content includes providing the user-generated video during the live playback of the first media component. In a specific example, selecting the user-generated video from the set of user-generated videos includes selecting the user-generated video based on relevance to the first media component. In a specific example, selecting the user-generated video from the set of user-generated videos includes selecting the user-generated video based on a redemption of a digital token by a redeeming user corresponding to the user-generated video.

In another example, user data (e.g., social media links, user account information, demographics, etc.) associated with the user-generated content can be presented with the user-generated content and/or with any suitable media components. However, user-generated content can be configured in any suitable manner.

Figure 9A:
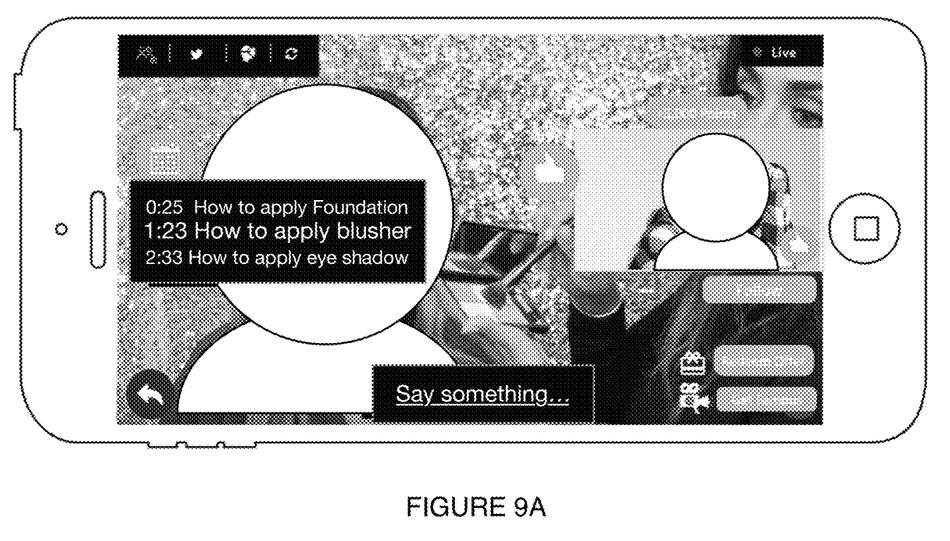
FIGS. 9A-9B include example representations of presenting timelines associated with a variation of an embodiment of a method for providing a plurality of media components.
Figure 9B:
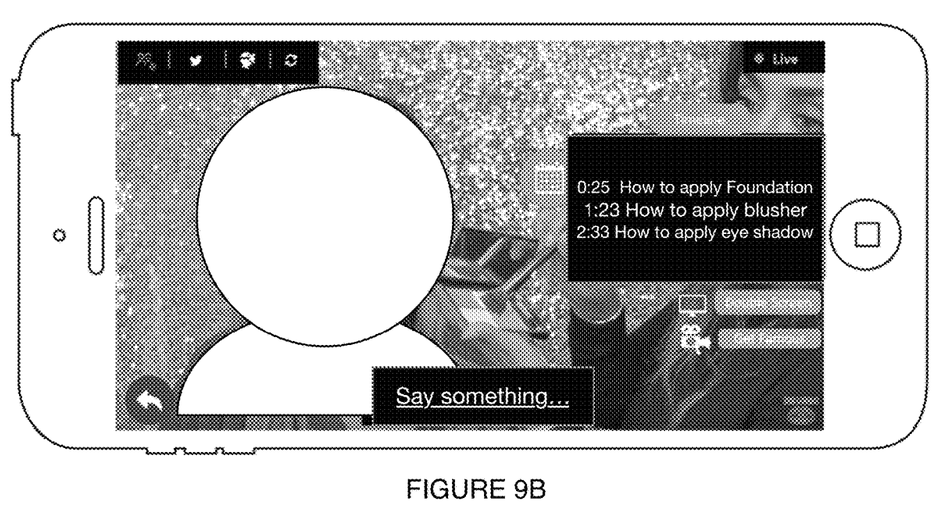

As shown in FIG. 9A-9B, in a variation, media components can include components associated with temporal indicators, such as timelines associated with content for the primary and/or supplementary media components. In an example, the method 100 can include determining timelines (e.g., manually, automatically, etc.) describing different portions of the content of the media components (e.g., a first and a second timeline for a first and a second media component, respectively, etc.), where the timelines enable users to interact with components of the presented timelines to view media component content associated with the corresponding time point and/or time period. However, components associated with temporal indicators can be configured in any suitable manner.

Determining one or more media components can include determining media parameters, which can include any one or more of: related media components (e.g., media components suitable for presentation at a supplementary media interface, such as simultaneously with presentation of the primary media component; related advertisements; related product items; related user-generated content; etc.), format parameters (e.g., audio, visual, video, images, verbal, virtual reality, augmented reality, touch-related, brightness, opacity, color, font, etc.), platform type (e.g., compatibility with different device types, suitability for mobile device, virtual reality device, augmented reality device, desktop device, connected device, etc.), metadata (e.g., author, upload time and date, file size, resolution, file name, associated user accounts, thumbnail, etc.), tags (e.g., topic categories relevant to the content of the media component, user tags describing user accounts associated with the media component, etc.), content descriptions (e.g., describing the type of content of the media component, content descriptions with any suitable format parameters, etc.), temporal indicators (e.g., timelines associated with different content portions of the media components, timestamps, content length, temporal triggers for supplementary media components to be presented with the primary media component, etc.).

Format parameters can include any one or more of: media component-specific parameters (e.g., format parameters specific to presenting and/or otherwise providing a media component, such as in coordination with determination and/or provision of a supplementary media component, such as dimming a primary media component to highlight the presentation of a supplementary media component; personalizing font parameters of a content timeline media component presented through a supplementary media interface to accommodate user preferences; etc.), graphical parameters (e.g. parameters associated with images, video, virtual reality, augmented reality, etc.); textual parameters (e.g., font size; font color; font type; other font parameters; spacing parameters; etc.); other parameters associated with visually perceptible digital elements (e.g., sizing, highlighting, etc.); audio parameters (e.g., parameters associated with music, sound notifications, a human voice; volume parameters; tone parameters; pitch parameters; etc.); touch parameters (e.g., braille parameters; haptic feedback parameters; etc.); delivery-related parameters (e.g., tailoring of format to device type such as for mobile phone device versus virtual reality device; device communication protocol; etc.) and/or any other suitable format-related parameters Media components are preferably provided through media interfaces, but can additionally or alternatively be provided through any suitable means. Media interfaces can include any one or more of: digital content screens (e.g., of varying dimensions, for display at one or more user devices; etc.), content viewing interfaces presented at user devices, audio interfaces for audio output, haptic-associated interfaces for haptic feedback provision, and/or any other suitable interfaces associated with media component provision.

Determining the second media component is preferably based on the first media component (e.g., the type of first media component, content of the first media component, a first media component identifier, first media component metadata such as topic category, other media component parameters for media component etc.).

In a variation, determining the second media component can be based on one or more user inputs from one or more users (e.g., user inputs collected by sensors of the user device). In an example, the method 100 can include providing a user voting process to determine a second media component to be provided through a second media interface (e.g., where the second media interface and/or other suitable media interfaces can be used to present the voting process preceding the provision of the voted upon content; etc.). In a specific example, content options to be voted upon can be determined (e.g., automatically determined, manually determined) based on the first media component (e.g., based on the content of the first media component; based on brands and/or other third parties associated with the content of the first media component; etc.).

In another variation, determining the second media component can be based on user data describing the user. In an example, the method 100 can include providing a same first media component (e.g., a same live broadcast of a media component, etc.) to a first and a second user; and determining different media components for different users for presentation at each user's respective second media interface at each user's respective mobile application (e.g., based on the different user's viewing histories, other user data, etc.). Additionally or alternatively, determining the second media component can be based on any suitable data.

Determining a second media component (and/or other suitable media component) can be performed with one or more media component models, which can include any one or more of: probabilistic properties, heuristic properties, deterministic properties, and/or any other suitable properties. In examples, determining media components and/or any other suitable portions of the method 100 can employ artificial intelligence approaches (e.g., machine learning approaches, etc.) including any one or more of: supervised learning (e.g., using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked auto-encoder method, etc.) reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial least squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable artificial intelligence approach.

Determining a supplementary media component is preferably performed in real-time (e.g., determination and/or provision of a second media component in real-time based on the current first media component being presented and/or portion of the first media component being presented to the user device at a given time and/or time period, etc.), but can additionally or alternatively be performed at any suitable time and frequency. However, determining a second and/or other suitable media component S120 can be performed in any suitable manner.

2.3 Providing a Supplementary Media Component.

The method 100 can include providing the second (and/or supplementary) media component, in coordination with provision of the first media component (e.g., simultaneously with first media component provision, etc.) at a second media interface (e.g., overlaid on the first media interface) presented at the user device of the user (e.g., simultaneously with the first media interface, etc.) S130, which can function to coordinate presentation of a plurality of media components to improve one or more user's viewing experience.

Providing the second media component can include determining one or more media interface parameters and/or providing the second media component according to one or more media interface parameters. Media interface parameters can include any one or more of dimensions (e.g., digital content screen dimensions, two-dimensional dimensions, three-dimensional dimensions, etc.), positioning (e.g., positioning of a media interface in relation to another media interface, such as positioning of an overlay of a second media interface over a first media interface, etc.), medium type (e.g., type of user device used for presentation of the media interface; etc.), media component associations (e.g., assignments of media components to one or more media interfaces such as for presentation at the media interfaces, etc.), and/or any other suitable parameters associated with media interfaces. In a specific example providing the second media component in coordination with providing the first media component includes providing the second media component at the second media interface simultaneously with providing the first media component at the first media interface. In a specific example, the first media interface and/or the second media interface provide the user with 360 degree viewability of the first media component and/or the second media component, respectively. In a specific example, providing the second media component simultaneously with providing the first media component includes providing the second media component at the second media interface overlaid on the first media interface, where the first media interface is sized to fit the dimensions of a physical screen of the mobile device, where the second media interface includes dimensions smaller than the first media interface, and where the second media interface is positioned within the borders of the first media interface.

In variations, as shown in FIG. 3, providing the second media component can be at a second media interface with dimensions smaller than a first media interface (e.g., displaying a first media component, etc.), and where the second media interface is positioned within the borders of the first media interface. Additionally or alternatively, the supplementary media interfaces (e.g., a second media interface) can have any suitable position (e.g., in a two-dimensional space, in a three-dimensional space, in any number of dimensions, etc.), dimensions, and/or other suitable media interface parameters relative a primary media interface (e.g., a first media interface), and/or other suitable media interfaces (e.g., at the same user device, at different user devices for any suitable distribution of media component provision across any suitable number of devices; etc.).

In a variation, providing the second media component can be based on one or more user inputs (e.g., collected at the user device at which one or more media interfaces are presented; collected at a supplementary user device in communication with a primary user device used for viewing of the media components; etc.). For example, a user can provide a user input (e.g., a double finger tap) to increase the dimensions of a second media interface (e.g., for maximizing a supplementary digital content screen) and/or other suitable media interface. In another example, a user can provide a user input (e.g., touch drag gesture, etc.) for repositioning (e.g., moving) a second media interface and/or other suitable media interface.

In examples, providing the second media component can include providing the second media component based on sensor data collected from user inputs (e.g., at and/or proximal the user device; etc.). In a specific example, providing the second media component can include modifying the perspective and/or view of the content of the second media component based on motion sensor data (e.g., modifying the perspective and/or view to track the movement and/or other suitable motion of the user device, such as corresponding to physical control of the device by the user; etc.). In another specific example, motion sensor data can be used in modifying a plurality of media components provided at a plurality of media interfaces, such as where the motion sensor data can be used in determining the modifications to a first view and a second view of a sporting event (e.g., rotating both the first and second view a certain amount of degrees about any suitable axes, in order to track the rotation of the user device indicated by the motion sensor data, etc.) simultaneously presented at the first media interface and second media interface, respectively.

In another specific example, optical sensor data (e.g., camera data) can be used in providing the second media component, such as where the optical sensor data can be used to control an avatar (e.g., presenting movements of the avatar resembling the movements of the user captured by the optical sensor data, etc.) resembling and/or otherwise related to the first media component being presented (e.g., where the type of avatar is selected based on the first media component being presented at a given time, etc.).

Providing the second media component and/or other suitable supplementary media components can be performed simultaneously with presenting a portion of a first media component, serially, and/or at any suitable time and frequency relative other suitable media components and/or relative performance of any suitable portions of the method 100.

However, providing the second (and/or supplementary) media component S130 can be performed in any suitable manner. Additionally or alternatively, the method 100 and/or portions of the method 100 can be performed in any suitable manner.

3. Other

Although omitted for conciseness, the embodiments include every combination and permutation of the various system components and the various method processes, including any variations, examples, and specific examples, where the method processes can be performed in any suitable order, sequentially or concurrently using any suitable system components. Any of the variants described herein (e.g., embodiments, variations, examples, specific examples, illustrations, etc.) and/or any portion of the variants described herein can be additionally or alternatively combined, excluded, and/or otherwise applied.

The system and method and embodiments thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the embodiments without departing from the scope defined in the following claims.

I claim:

1. A method for providing a plurality of media components to a viewing user, the method comprising:
   collecting, from the viewing user, a user selection of a first media component at a mobile application executing on a mobile device of the viewing user, wherein the first media component is provided by a creator distinct from the viewing user;
   initiating playback of the first media component at a first media interface presented through the mobile application;
   determining a second media component for playback through the mobile application, based on the first media component;
   providing the second media component in coordination with providing the first media component, wherein the second media component is provided at a second media interface positioned proximal the first media interface, wherein the second media component comprises user controls for controlling a view of the first media component;
   in response to collecting a user touch input from the viewing user at the user controls during a time period, adjusting the view of the first media component at the mobile device based on the user touch input, wherein the view of the first media component comprises a 360 degree view of the first media component;
   in response to collecting, during the time period, motion sensor data corresponding to a motion sensor of the mobile device, adjusting the view of the first media component at the mobile device based on the motion sensor data;
   providing, in coordination with providing the first and the second media components, a third media component associated with the first media component, wherein the third media component and the first media component comprise different video views of same content, and wherein the third media component is overlaid on the first media component presented through the mobile application;
   in response to collecting the user touch input from the viewing user at the user controls during the time period, adjusting a 360 degree view of the third media component, concurrently with adjusting the 360 degree view of the first media component, thereby simultaneously controlling different 360 degree video views of the same content at the mobile device based on the user touch input; and
   in response to collecting, during the time period, motion sensor data corresponding to a motion sensor of the mobile device of the viewing user, adjusting the 360 degree view of the third media component overlaid on the first media component, concurrently with adjusting the 360 degree view of the first media component, thereby simultaneously controlling the different 360 degree video views of the same content at the mobile device based on the motion sensor data.

2. The method of claim 1, wherein the playback of the first media component comprises live playback of the first media component, wherein the second media component comprises user-generated content, wherein the method further comprises:
   collecting, during the live playback of the first media component, the user-generated content, wherein providing the second media component in coordination with providing the first media component comprises providing the user-generated content during the live playback of the first media component.

3. The method of claim 2, further comprising:
   determining, during the live playback of the first media component, the third media component based on the user-generated content provided during the live playback of the first media component; and
   providing the third media component, at the mobile device, in coordination with providing the user-generated content.

4. The method of claim 3, wherein determining the third media component comprises:
   determining a real-time analysis of the user-generated content; and
   selecting, during the live playback of the first media component, the third media component based on the real-time analysis of the user-generated content.

5. The method of claim 3, further comprising:
   providing a redemption interface, during the live playback of the first media component and in coordination with providing the third media component, for facilitating a purchase transaction of a product associated with the third media component and provided by a creator associated with the first media component; and collecting, via the redemption interface, a digital token from the viewing user during the live playback of the first media component.

6. The method of claim 1, wherein providing the second media component in coordination with providing the first media component comprises providing the second media component at the second media interface simultaneously with providing the first media component at the first media interface.

7. The method of claim 6, wherein the first media interface and the second media interface provide the viewing user with 360 degree viewability of the first media component and the second media component, respectively.

8. The method of claim 7, wherein providing the second media component simultaneously with providing the first media component comprises providing the second media component at the second media interface overlaid on the first media interface, wherein the first media interface is sized to fit dimensions of a physical screen of the mobile device, wherein the second media interface comprises dimensions smaller than the first media interface, and wherein the second media interface is positioned within borders of the first media interface.

9. The method of claim 1, wherein selecting the user-generated video from the set of user-generated videos comprises selecting the user-generated video based on relevance to the first media component.

10. The method of claim 9, wherein selecting the user-generated video from the set of user-generated videos comprises selecting the user-generated video based on relevance to the first media component and on a redemption of a digital token by a redeeming user corresponding to the user-generated video.

11. The method of claim 1, wherein the user controls comprise up, down, left, and, right options selectable by the viewing user for simultaneously controlling the different 360 degree video views of the same content at the mobile device based on the user touch input at the user controls.

12. The method of claim 11, further comprising providing the up, down, left, and right options for a limited time period to the viewing user and not to a set of other users, based on magnitude of a redemption provided by the viewing user at a redemption interface presented to the viewing user through the mobile application.

13. A method for providing a plurality of media components at a user device, the method comprising:

collecting a user input associated with media component playback at the user device;

providing, at the user device, a first media component at a first media interface for the user device, based on the user input, wherein providing the first media component comprises providing live playback of the first media component;

determining a second media component for playback at the user device, based on the first media component, wherein the second media component comprises a user-generated video, wherein determining the user-generated video comprises:

collecting, during the live playback of the first media component, a set of user-generated videos from a plurality of users, and selecting the user-generated video from the set of user-generated videos;

providing, at the user device and in coordination with provision of the first media component, the second media component at a second media interface through a mobile application for the user device, wherein providing the second media component in coordination with providing the first media component comprises providing the user-generated video during the live playback of the first media component;

providing, in coordination with providing the first media component and the user-generated video, a third media component associated with the first media component, wherein the third media component and the first media component comprise different video views of same content, and wherein the third media component is overlaid on the first media component presented through the mobile application; and in response to collecting motion sensor data corresponding to a motion sensor of the user device, adjusting the 360 degree view of the third media component overlaid on the first media component, concurrently with adjusting the 360 degree view of the first media component, thereby simultaneously controlling the different 360 degree video views of the same content at the user device based on the motion sensor data.

14. The method of claim 13, wherein the second media component comprises a survey, wherein providing the second media component comprises providing the survey in coordination with providing the first media component, and wherein the method further comprises:

collecting, during provision of the survey, a plurality of survey responses from a plurality of users, wherein the plurality of survey responses comprises a survey response from the user; and providing the user with a redeemable digital token based on the survey response from the user.

15. The method of claim 13, further comprising:

in response to collecting the motion sensor data corresponding to the motion sensor of the user device, concurrently adjusting the 360 degree view of the first media component and a 360 degree view of the second media component, based on the motion sensor data.

16. The method of claim 13, wherein providing the second media component in coordination with providing the first media component comprises providing the second media component at the second media interface simultaneously with providing the first media component at the first media interface.

17. The method of claim 16, wherein providing the second media component simultaneously with providing the first media component comprises providing the second media component at the second media interface overlaid on the first media interface, and wherein the first media interface and the second media interface provide the user with 360 degree viewability of the first media component and the second media component, respectively.

18. The method of claim 17, wherein the first media interface is sized to fit dimensions of a physical screen of the user device, wherein the second media interface comprises dimensions smaller than the first media interface, and wherein the second media interface is positioned within borders of the first media interface.

19. The method of claim 13, wherein determining the user-generated video comprises providing a user voting process for voting upon the set of user-generated videos from the plurality of users, and selecting the user-generated video from the set of user-generated videos based on the voting.

* * * * *